US008732829B2

(12) United States Patent
Johnson et al.

(10) Patent No.: US 8,732,829 B2
(45) Date of Patent: May 20, 2014

(54) SYSTEM AND METHOD FOR MONITORING AND SECURING A BASEBOARD MANAGEMENT CONTROLLER

(75) Inventors: William D. Johnson, Allen, TX (US); Darel R. Stokes, Allen, TX (US); Barry L. Moore, Richardson, TX (US)

(73) Assignee: TDI Technologies, Inc., Plano, TX (US)

( * ) Notice: Subject to any disclaimer, the term of this patent is extended or adjusted under 35 U.S.C. 154(b) by 810 days.

(21) Appl. No.: 12/102,605

(22) Filed: Apr. 14, 2008

(65) Prior Publication Data

US 2009/0260081 A1 Oct. 15, 2009

(51) Int. Cl.
*G06F 7/04* (2006.01)
*G06F 17/30* (2006.01)
*G06F 11/00* (2006.01)
*G06F 12/14* (2006.01)
*G06F 12/16* (2006.01)
*G08B 23/00* (2006.01)

(52) U.S. Cl.
USPC ............................................. 726/23; 726/2

(58) Field of Classification Search
USPC ......................................................... 726/23
See application file for complete search history.

(56) References Cited

U.S. PATENT DOCUMENTS

| 2,843,675 | A | * | 7/1958 | Collins | 379/8 |
| 4,586,134 | A | * | 4/1986 | Norstedt | 709/228 |
| 5,150,357 | A | * | 9/1992 | Hopner et al. | 370/354 |
| 5,228,076 | A | * | 7/1993 | Hopner et al. | 379/93.17 |
| 5,303,351 | A | * | 4/1994 | Jackowski et al. | 714/43 |
| 5,371,897 | A | * | 12/1994 | Brown et al. | 709/222 |
| 5,542,048 | A | * | 7/1996 | Olnowich et al. | 709/243 |
| 5,613,069 | A | * | 3/1997 | Walker | 709/238 |
| 5,740,432 | A | | 4/1998 | Mastors | 395/618 |
| 5,819,094 | A | | 10/1998 | Sato et al. | 395/704 |
| 5,832,518 | A | | 11/1998 | Mastors | 707/202 |
| 5,931,949 | A | * | 8/1999 | Perlman et al. | 713/300 |
| 6,092,087 | A | | 7/2000 | Mastors | 707/202 |
| 6,151,218 | A | * | 11/2000 | Pirdy et al. | 361/727 |
| 6,243,838 | B1 | | 6/2001 | Liu et al. | 714/57 |
| 6,266,053 | B1 | * | 7/2001 | French et al. | 715/255 |
| 6,289,379 | B1 | | 9/2001 | Urano et al. | 709/223 |
| 6,341,312 | B1 | * | 1/2002 | French et al. | 709/227 |
| 6,367,018 | B1 | * | 4/2002 | Jain | 726/2 |
| 6,434,616 | B2 | | 8/2002 | Urano et al. | 709/224 |
| 6,438,597 | B1 | * | 8/2002 | Mosberger et al. | 709/227 |
| 7,010,601 | B2 | * | 3/2006 | Yoshimine et al. | 709/226 |
| 7,139,828 | B2 | * | 11/2006 | Alkhatib et al. | 709/230 |
| 7,286,539 | B2 | * | 10/2007 | Tsuge et al. | 370/392 |
| 7,325,204 | B2 | * | 1/2008 | Rogers | 715/792 |

(Continued)

OTHER PUBLICATIONS

PCT Notification of Transmittal of the International Search Report and the Written Opinion of the International Searching Authority, or the Declaration, mailed Apr. 22, 2009, regarding PCT/US2009/36720 filed Mar. 11, 2009 (6 pages).

(Continued)

*Primary Examiner* — Carolyn B Kosowski
(74) *Attorney, Agent, or Firm* — Baker Botts L.L.P.

(57) ABSTRACT

In certain embodiments, a method for monitoring and securing a baseboard management processor is provided. The method includes coupling to a baseboard management controller of a computer system via a console port, maintaining a persistent connection to the baseboard management controller, monitoring data from the console port, determining from the data whether an unauthorized access has occurred, and sending an alert if the unauthorized access has occurred.

36 Claims, 3 Drawing Sheets

(56) References Cited

U.S. PATENT DOCUMENTS

| | | | |
|---|---|---|---|
| 7,404,205 B2 * | 7/2008 | Scoredos et al. | 726/13 |
| 7,461,401 B2 * | 12/2008 | Leppanen et al. | 726/11 |
| 7,617,525 B1 * | 11/2009 | Moeck et al. | 726/11 |
| 7,647,430 B2 * | 1/2010 | Ng et al. | 710/5 |
| 7,685,310 B2 * | 3/2010 | Ueoka et al. | 709/241 |
| 7,891,000 B1 * | 2/2011 | Rangamani et al. | 726/22 |
| 8,001,590 B1 * | 8/2011 | Moeck et al. | 726/11 |
| 8,046,517 B2 * | 10/2011 | Morozumi | 710/313 |
| 2002/0032697 A1 * | 3/2002 | French et al. | 707/500.1 |
| 2002/0162017 A1 | 10/2002 | Sorkin et al. | 713/201 |
| 2002/0184366 A1 | 12/2002 | Kimoto et al. | 709/224 |
| 2003/0031190 A1 * | 2/2003 | Ohnishi | 370/401 |
| 2004/0044777 A1 * | 3/2004 | Alkhatib et al. | 709/228 |
| 2005/0010811 A1 * | 1/2005 | Zimmer et al. | 713/201 |
| 2005/0138483 A1 | 6/2005 | Hatonen et al. | 714/45 |
| 2005/0154977 A1 | 7/2005 | Abigail | 715/513 |
| 2006/0031520 A1 * | 2/2006 | Bedekar et al. | 709/227 |
| 2006/0040711 A1 | 2/2006 | Whistler | 455/566 |
| 2006/0160395 A1 * | 7/2006 | Macauley et al. | 439/344 |
| 2006/0184498 A1 | 8/2006 | Meyer et al. | 707/1 |
| 2006/0218204 A1 | 9/2006 | Ofer et al. | 707/201 |
| 2006/0248165 A1 | 11/2006 | Sridhar et al. | 709/218 |
| 2006/0282893 A1 * | 12/2006 | Wu et al. | 726/23 |
| 2007/0088816 A1 | 4/2007 | Hrustemovic et al. | 709/224 |
| 2007/0118641 A1 | 5/2007 | Zhuo et al. | 709/224 |
| 2007/0150582 A1 * | 6/2007 | Aaron et al. | 709/224 |
| 2007/0156698 A1 | 7/2007 | Gebhart et al. | 707/10 |
| 2007/0198420 A1 * | 8/2007 | Goldstein | 705/52 |
| 2007/0282921 A1 | 12/2007 | Atluri et al. | 707/202 |
| 2007/0283194 A1 | 12/2007 | Villella et al. | 714/57 |
| 2008/0040522 A1 | 2/2008 | Matthews | 710/107 |
| 2009/0019544 A1 * | 1/2009 | Suffern et al. | 726/22 |
| 2012/0124185 A1 * | 5/2012 | Kacin et al. | 709/221 |
| 2012/0131188 A1 * | 5/2012 | Itano | 709/224 |

OTHER PUBLICATIONS

European Patent Office, "Communication," Application No. 09755325.9-2212/2288977, PCT/US2009036720, 8 pages, May 23, 2011.

Bos et al., "Towards Software-Based Signature Detection for Intrusion Prevention on the Network Card," 22 pages, Jan. 1, 2006.

Intel, "Intel® Active Management Technology System Defense and Agent Presence Overview," Feb. 2007, 26 pages.

Intel, "Intel® Active Management Setup and Configuration Service, Installation and User Manual," Nov. 2006, 120 pages.

European Patent Office, "Communication Pursuant to Article 94(3) EPC," Application No. 09755325.9-2212, 4 pages, May 23, 2012.

Office Action issued by the Canadian Intellectual Property Office for Application No. 2,721,383, Nov. 14, 2013.

* cited by examiner

US 8,732,829 B2

SYSTEM AND METHOD FOR MONITORING AND SECURING A BASEBOARD MANAGEMENT CONTROLLER

TECHNICAL FIELD

The present invention relates generally to monitoring computer systems, and more particularly to monitoring and securing a baseboard management controller via a persistent connection to a console port.

BACKGROUND

Traditional computer data centers use large mainframe systems to handle large scale computing needs. A large mainframe system typically resides at a single location and has a separate operator console for the system. More recently, computer data centers have moved from a large mainframe system to an interconnected system of individual devices that typically resides throughout a network. Each individual device generally has a console. Simple Network Management Protocol (SNMP) was developed to manage the data that was generated from the individual devices. SNMP, however, is not scalable.

A baseboard management controller (BMC) was developed to resolve the scalability problem. The BMC is essentially a mini computer within a computer. The BMC is generally an application specific integrated circuit (ASIC) device with its own baseboard processor, memory, operating system, and software or firmware. If a motherboard is attached to a power supply, the BMC is powered on, but the rest of the motherboard's components, including the processing unit, memory, and peripheral devices, need not be powered on.

SUMMARY

According to one embodiment, a method for monitoring and securing a baseboard management processor is provided. The method includes coupling to a baseboard management controller of a computer system via a console port, maintaining a persistent connection to the baseboard management controller, monitoring data from the console port, determining from the data whether an unauthorized access has occurred, and sending an alert if the unauthorized access has occurred.

According to other embodiments, a system for monitoring and securing a baseboard management processor is provided. The system includes, one or more processing units operable to couple to a baseboard management controller of a computer system via a console port, maintain a persistent connection to the baseboard management controller, monitor data from the console port, determine from the data that an unauthorized access has occurred, and send an alert that the security event has occurred.

Certain embodiments of the present invention may provide some, all, or none of the above advantages. Certain embodiments may provide one or more other technical advantages, one or more of which may be readily apparent to those skilled in the art from the figures, descriptions, and claims included herein.

BRIEF DESCRIPTION OF THE DRAWINGS

For a more complete understanding of the present disclosure and its advantages, reference is made to the following descriptions, taken in conjunction with the accompanying drawings, in which.

DETAILED DESCRIPTION OF EXAMPLE EMBODIMENTS

Figure 1:
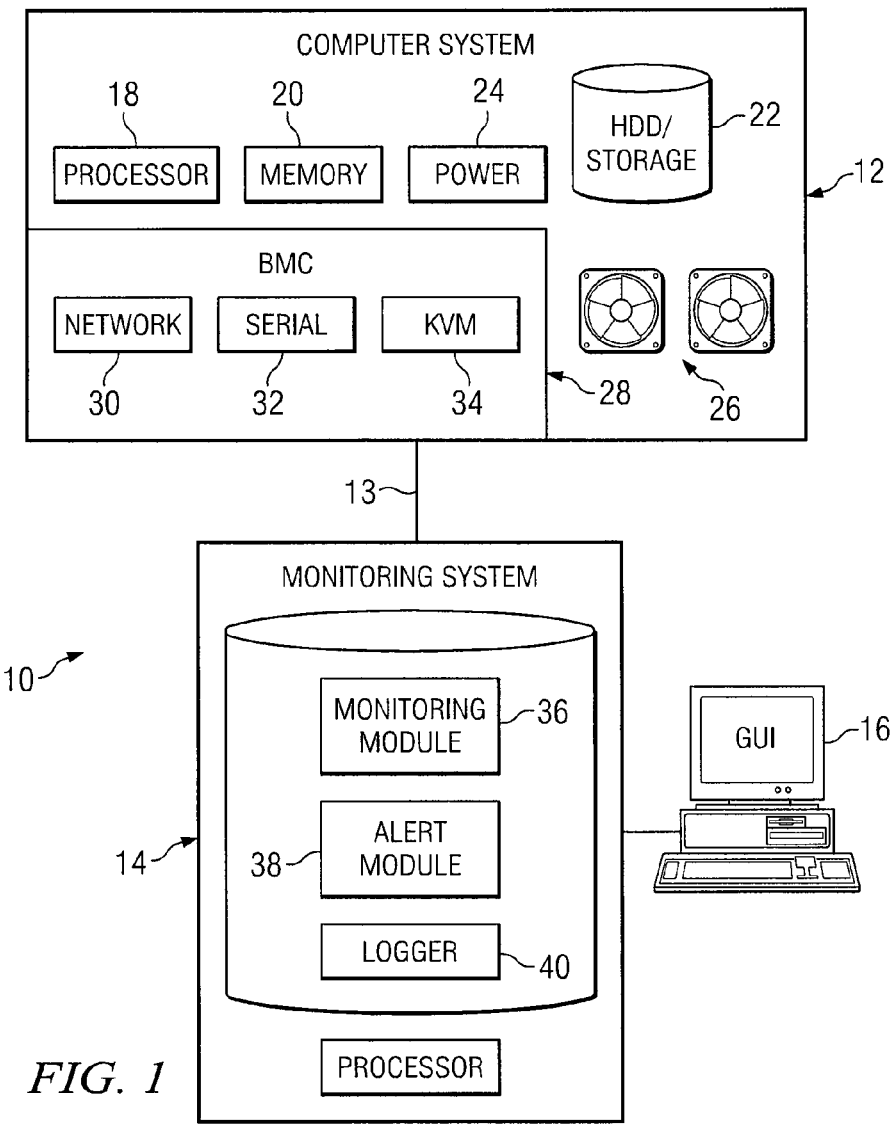
FIG. 1 is a block diagram illustrating an example system for monitoring and securing a baseboard management controller.

FIG. 1 is a block diagram of an example system for monitoring and securing a baseboard management controller. In the illustrated system, system 10 includes one or more computer systems 12 operably coupled to a monitoring system 14 and a user system 16. Among other elements, computer system 12 includes a baseboard management controller 28 that may be monitored and secured. Although this particular implementation of system 10 is illustrated and primarily described, the present invention contemplates any suitable implementation of system 10 according to particular needs.

According to certain embodiments of the invention, computer system 12 represents a system to be secured against unauthorized access. Monitoring system 14 creates a persistent direct connection to computer system 12, and monitors, analyzes, and/or logs data received from computer system 12. According to the teachings of the disclosure, monitoring system 14 can address breaches of security through baseboard management controller 28. This may avoid situations in which baseboard management controller 28 allows unauthorized access to computer system 12 that may compromise data or other systems to which computer system 12 has access. User system 16 may be used to configure monitoring system 14 and display alerts received from monitoring system 14.

In particular embodiments, computer system 12 can be any suitable computing system, such as a stand alone or connected computing system. Examples of computing systems include IBM BLADE servers, personal computers (such as INTEL, ADVANCED MICRO DEVICES (AMD), or POWER PC computers), specialized server or distributed computing systems, workstations, Unix-based computers, server computers, one or more server pools, or any other suitable computer systems. Computer system 12 may be a virtual machine that is implemented in software and run on a mainframe type system. In such cases, connections to computer system 12 may be virtual.

In general, computer system 12 comprises a CPU 18 (also referred to as processor or processing unit), memory 20, one or more hard disk drives 22, a power supply 24, a cooling system 26, and a baseboard management controller 28. Baseboard management controller 28 is operable to communication input and output thorough receive inputs through the input/output (I/O) ports, for example, network ports 30, serial ports 32, or keyboard, video, mouse (KVM) ports 34. CPU 18 may include one or more processors, such as microprocessors manufactured by INTEL, AMD, or other manufacturer. The processors may be local to or remote from other components of computer system 12. Memory 20 may include any memory or database module and may be volatile or non-volatile memory, for example, magnetic media, optical media, random access memory (RAM), read-only memory (ROM), removable media, or any other suitable memory component. Memory 20 may be local to or remote from other components of system 10.

Storage devices 22 may include hard disk drives, flash memory drives, storage server farms, and other forms of computer readable tangible storage media. Storage devices 22 may be in the form of external or internal devices coupled to computer system 12 via any suitable communication link. Storage devices 22 may be local to or remote from other components of system 10. Power supplies 24 may comprise transformers, power blocks, batteries, capacitors, uninterruptible power supplies, and other devices capable of supplying power to computer system 12. Cooling system 26 may comprise fans, liquid cooling systems, air conditioning systems, and/or heat sinks.

In particular embodiments, baseboard management controller 28 allows a user (such as an information technology administrator) to access computer system 12 locally or remotely. Access may be allowed regardless of whether computer system 12 is operating in a powered on or powered off state and irrespective of any operating system that may be running on computer system 12. Examples of baseboard management controllers include INTEGRATED LIGHTS-OUT by HEWITT-PACKARD CO., DELL REMOTE ACCESS CONTROLLER by DELL COMPUTERS, INC., and ACTIVE MANAGEMENT TECHNOLOGY by INTEL CORP. Additional details of an example of baseboard management controller 28 are described in conjunction with FIG. 2.

Monitoring system 14 may include one or more computing systems operable to receive, transmit, process, and store data associated with system 10. For example, monitoring system 14 may be systems recited with respect to computer system 12. In certain embodiments, monitoring system 14 comprises an email server, which may or may not be a part of a larger server system. Although a single monitoring system 14 is illustrated, the present invention contemplates system 10 including any suitable number of monitoring systems 14.

In particular embodiments monitoring system 14 includes monitoring module 36, alert module 38, and logger 40. Monitoring module 36 may be any suitable combination of hardware, software, or firmware that is operable to receive data from and send data to computer system 12. Monitoring module may send data to computer system 12 via the same or a different data channel that computer system 12 uses to communicate with monitoring system 14.

Monitoring module 36 may establish and maintain a persistent direct connection to baseboard management controller 28. A direct connection may be made through a communication link 13. For example, a direct connection may be made through a cable and/or any suitable network structure, such as servers or routers. A persistent connection is maintained even when computer system 12 is powered off. That is, monitoring system 14 communicates with baseboard management controller 28 even when computer system 12 is powered off.

Alert module 38 may be any suitable combination of hardware, software, or firmware that is operable to analyze data from computer system 12, detect unauthorized access, and create alerts. Alert module 38 may comprise a web server or email server, which may or may not be part of a larger server system.

In certain embodiments, alert module 38 may examine data to detect certain features, such as patters, signatures, or keywords that indicate unauthorized access. If the features are detected, alert module 38 determines that unauthorized access has occurred.

Alert module 38 may detect any type of unauthorized access in any suitable manner. In one example, alert module 38 may determine that a number of login failures have occurred within a time period. The number may exceed a login failure threshold, which may indicate a break in attempt. The login failure threshold may be given as a number of attempts during a time period, and may have any suitable values. For example, the failure threshold may be 5 or more, 10 or more, or 15 or more failures within less than one, less than five, or less than ten minutes.

In another example, alert module 38 may detect certain keywords in the data that indicate unauthorized access. Examples of such keywords include "admin," "password," and "passcode." In another example, alert module 38 may detect repeated requests from an Internet Protocol (IP) address for different ports of baseboard management controller 28. For example the requests may request connections to port 1, port 2, port 3, and so forth.

In another example, alert module 38 may detect particular register values that are known signatures of malicious programs. Examples of known signatures may include value FF in register AX and value 2C in register BX, or consecutives values 3C, F3, and C8 in register AX.

Other examples of alerts include, messages from components within computer system 12 such as, storage devices 22 is full, has a bus error, or the writeback cache is incorrect. Other messages from components of computer system 12 include, power supply 24 failure or fluctuations, memory 20 crc check or bank failure, CPU 18 secondary core failure, primary CPU double error halt. Messages may also include error message indications from an operating system running on computer system 12, error messages from components of computer system 12 being monitored by baseboard management controller 28, or as a result of user input from user system 16.

Logger 40 may be any suitable combination of hardware, software, or firmware that is operable to receive data from computer system 12 and store the received data for later retrieval. Logger 40 may comprise hard disk drives, flash drives, removable media, optical media, and/or any other suitable storage medium. Logger 40 may time stamp the received data from computer system 12.

Computer system 12 may be coupled to monitoring system 14 via one or more communication links 13 (for simplicity, referred to hereinafter in the singular). Communication link 13 facilitate wireless or wireline communication. Examples of communication link 13 include universal serial bus (USB), network, Ethernet, ADVANCED TECHNOLOGY ATTACHMENT (ATA), SERIAL ATA, or FIREWIRE connections. Communication link 13 may communicate information (such as voice, video, or data) in any suitable format such as IP packets, Frame Relay frames, Asynchronous Transfer Mode (ATM) cells, or other packet format. Communication links 13 may communicate through a network. Examples of networks include one or more local area networks (LANs), wireless local area networks (wLANs), radio access networks (RANs), metropolitan area networks (MANs), wide area networks (WANs), all or a portion of the global computer network known as the Internet, and/or any other communication system or systems at one or more locations.

User system 16 may include one or more input/output devices that allow user to interface with monitoring system 14. In one example, user system 16 includes a display device with a graphical user interface (GUI) that may allow a user to configure alert module 36 with predefined patterns or data signatures for alerts, to configure how a notification is sent, and/or to interface with computer system 12. In some embodiments, GUI may include software that is able to obtain log files over a network and display the log files. In an example embodiment, user system 16 may connect to monitoring system 14 via an HTTP address and request logged information.

User system 16 can also be used to connect to baseboard management controller 28. Baseboard management controller 28 may be default configured from the manufacturer to allow access through network 30, serial 32, or KVM 34 port. In a particular embodiment, user system 16 can access baseboard management controller 28 and disable connection to baseboard management controller via serial 32 and/or KVM 34 port to secure baseboard management controller 28.

Monitoring system 14 and user system 16 may be part of the same system or operably coupled via any suitable communication link, such as a link like communication link 13. Additionally, although various components of computer system 12, monitoring system 14, and user system 16 are illustrated and described separately, the present disclosure contemplates combining these components or further separating these components.

In operation of an embodiment of system 10, computer system 12 may be in either a powered on or off state. Monitoring system 14 accesses baseboard management controller 28 through monitoring module 36. A persistent direct connection to baseboard management controller 28 is maintained by monitoring module 36. Monitoring module 36 receives data from computer system 12. The data is logged by logger 40. Alert module 38 detects an unauthorized access from the data. An alert is generated by alert module 38 and sent to user system 16. Logger 40 records that an alert was generated.

Figure 2:
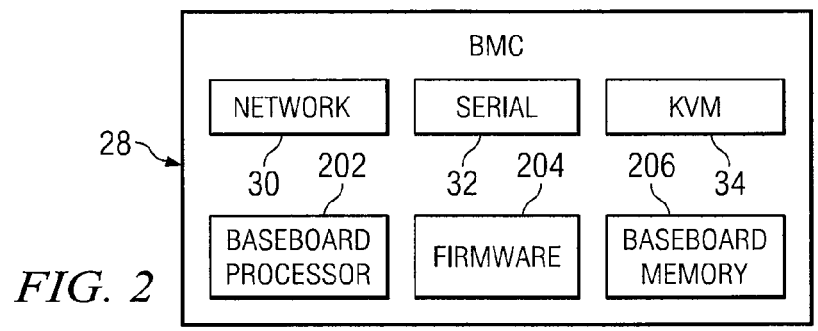
FIG. 2 is block diagram illustrating an example of the baseboard management controller of FIG. 1 in greater detail.
Figure 3:
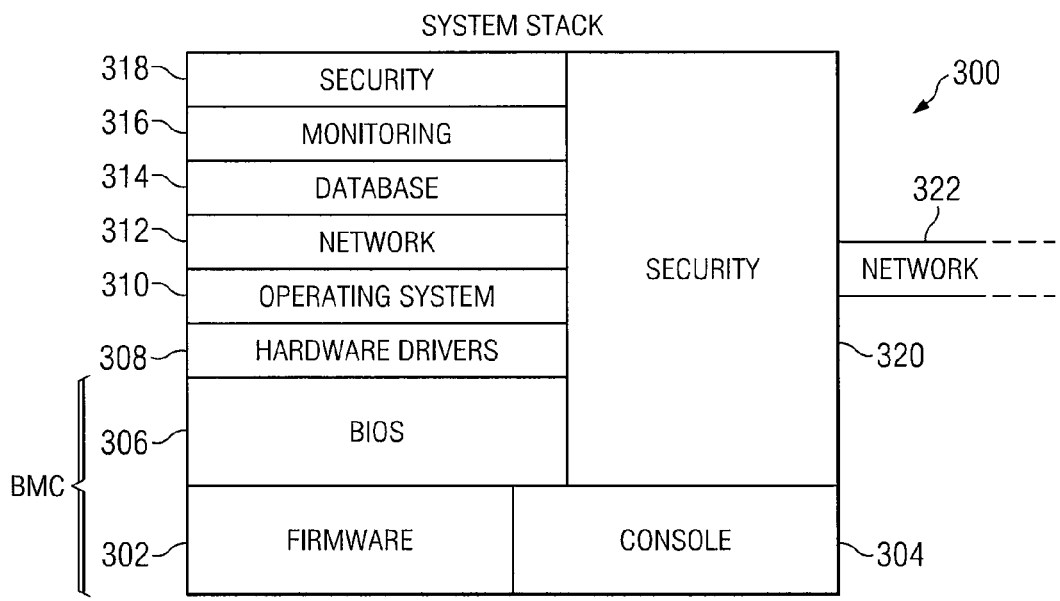
FIG. 3 is a block diagram illustrating an example of a system stack relating to the computer system of FIG. 1.
Figure 4:
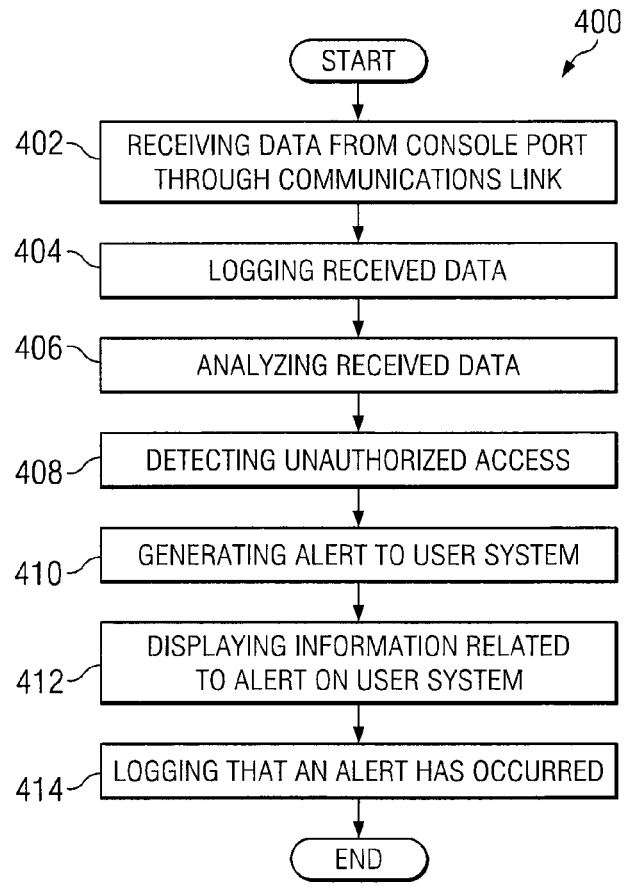
FIG. 4 is a flowchart illustrating an example of a method of analyzing data received from the computer system of FIG. 1.
Figure 5:
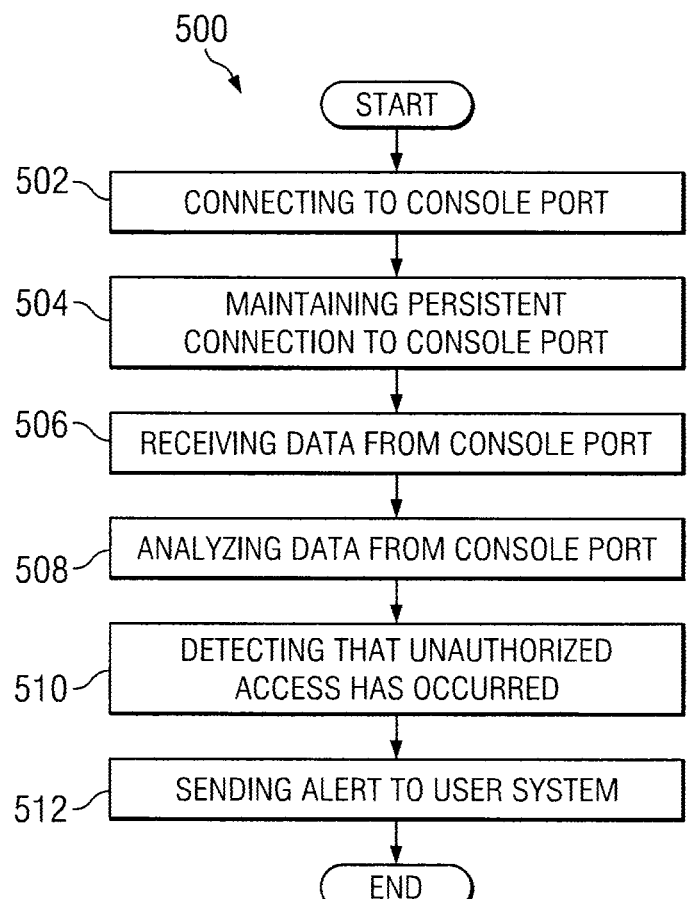
FIG. 5 is a flowchart illustrating an example of a method for monitoring and securing a baseboard management controller.

To better understand certain embodiments in this disclosure, FIG. 2 illustrates baseboard management controller 28 in more detail including additional components that are not illustrated in FIG. 1. FIG. 3 is an example of a system stack that shows an example load sequence of processes. FIG. 4 is a flowchart of monitoring system 14 in operation. FIG. 5 is a flowchart of an example method of securing a baseboard management controller 28.

FIG. 2 is a block diagram that illustrates a more detailed view of baseboard management controller 28. Baseboard management controller 28 comprises a baseboard processor 202, baseboard memory 206, firmware 204, and ports of computer system 12, such as network 30, serial 32, and/or KVM 34 ports. Baseboard management controller 28 may be regarded as a computer within a computer.

In particular embodiments, baseboard management controller 28 operates similarly to a serial console, but may perform more, fewer, or other operations. Baseboard management controller 28 may monitor the power consumption and internal temperature of other components. Baseboard management controller 28 may access the physical memory of computer system 12 when it is in a powered on state.

Baseboard processor 202 may be any suitable processing unit, such as INTEL CORE2, AMD ATHLON, or application specific integrated circuit (ASIC) type processing unit. Baseboard memory 206 may be read only memory (ROM), random access memory (RAM), erasable programmable read-only memory (EPROM), electrically erasable programmable read-only memory (EEPROM), memory integrated into an ASIC processor, or other suitable form of storage. Firmware 204 may be logic encoded on any suitable computer readable storage medium that when executed is operable to run programs related to the operation of baseboard management controller 28. For example, firmware can be encoded on EPROMS, EEPROMS, static random access memory (SRAM), flash memory, or other suitable medium. Examples of programs on firmware 204 may include low level hardware drivers, operating systems, network interfaces, security processes, and/or basic input/output systems for baseboard management controller 28 or computer system 12.

Network 30, serial 32, and KVM 34 ports may be interfaces of baseboard management processor 28. Network 30 port connects baseboard management controller 28 to a network. Network 30 port may be a port to which baseboard management controller 28 is programmed to respond, and may be represented by a port number. Network 30 port may be provided by Ethernet connections, 802.11 connections, FIREWIRE connections, or other suitable network connections. Serial 32 port may be a legacy port used with mainframe computers. KVM 34 port may include separate input/output ports for a keyboard, for a video monitor, and a mouse. KVM 34 port may use interfaces such as USB, video graphics array (VGA), digital visual interface (DVI), BLUETOOTH, or any other suitable interface.

In particular embodiments, baseboard management controller 28 monitors the functions of computer system 12 and can directly affect the operating system and other components of computer system 12. Baseboard management controller 28 may reboot computer system 12 or power on or off other elements of the motherboard, such as the CPU. For example, when the power button is pressed, the baseboard management controller 28 shuts down other components of the motherboard. In one example, baseboard management controller 28 performs an emergency shutdown when the power button of computer system 12 is held down. The baseboard management controller 28 remains active, even when the other components are in an inactive state. For example, when computer system 12 is powered off, CPU 18, motherboard, memory modules 20, hard disk drives 22, and peripherals are in an inactive state, but baseboard management controller 28 is active.

In particular embodiments, baseboard management controller 28 is network enabled. A management port (also referred to as a console port), which may comprise network 30, serial 32, and/or KVM 34 ports, connects the baseboard management controller 28 to the network. When connected, baseboard management controller 28 becomes accessible via a network connection. Baseboard management controller 28 acts as a proxy, and communications not directed to the baseboard management controller 28 may be passed directly to computer system 12.

In certain situations, computer system 12 cannot detect connections to the management port of baseboard management controller 28. If computer system 12 is in a powered off state, it cannot detect connections. If computer system 12 is in a powered on state, but not monitoring connections to the management port, computer system 12 cannot detect connections. Accordingly, baseboard management controller 28 is susceptible to unauthorized access. In certain situations, the baseboard management controller may be susceptible to a brute force attack used to gain unauthorized access. In these situations, security holes may be introduced into the main operating system through memory 20.

FIG. 3 is a block diagram illustrating an example of a system stack 300 relating to the computer system of FIG. 1. System stack 300 represents an example list of processes or applications and the order in which they are loaded as computer system 12 is booted. Firmware 302, console 304, basic input/output system (BIOS) 306, and hardware drivers 308 represent application layers of baseboard management controller 28. Firmware 302 may include firmware 204 that resides on baseboard management controller 28 as well as any additional firmware that may be present on computer system 12.

Computer system 12 operates in two different states, powered off and powered on. When computer system 12 is in a powered on state, the CPU is in an active state, an operating system has been loaded, and the network connections are available. During power on and start up, firmware 302 and console 304 form the basis on which other processes and applications rely. Firmware 302 may include basic hardware drivers 308 and may connect to console 304 and load BIOS 306. Firmware 302 may have data on the systems and capabilities of the motherboard on which baseboard management controller 28 resides. BIOS 306 may use the data to load the proper hardware drivers 308 to identify, configure, and administer the systems.

After hardware drivers 308 have been loaded, operating system 310 can be loaded. Examples of operating systems 310 include WINDOWS XP, WINDOWS VISTA, LINUX, SUN OS, KNOPPIX, or other general or special operating systems. After operating system 310 has been loaded, other processes may be loaded, such as network 312, databases 314, monitoring 316, and/or security 318 processes in that or other order.

Monitoring 316 process may monitor computer system 12 performance, processor 18 performance, hard disk drive (HDD)/storage 22 capacity, incoming and outgoing network 312 communications, system temperature, and/or other features. Security 318 process may use security software such as antivirus and/or firewall software.

Security 320 process may use a built in security that is present at each application layer. For example, a username and/or password may be required in order to edit the settings of BIOS 306, network 312 process, and/or monitoring 316 process. Hardware drivers 308, operating system 310, and/or database 314 process may use checksums to verify authenticity.

Certain security functions may be available only when monitor computer system 12 is powered on. Examples of such functions include firewalls, anti-virus, and username/password functions. If computer system 12 is powered off, however, these functions cannot protect baseboard management controller 28, which remains active even when computer system 12 is powered off. In particular embodiments, the port that baseboard management controller 28 may use to send a notification of unauthorized access may be attacked.

FIG. 4 is a flowchart of an example embodiment of a method of analyzing data that may be performed by monitoring system 14. In the illustrated embodiment, computer system 12 is connected to monitoring system 14. At step 402, data is received from console port through communication link 13, and monitored by monitoring module 36. Monitoring module 36 passes the data to alert module 38 and logger 40. At step 404, logger 40 receives the data and creates a storage location for the data in a log file. Logger 40 may add a time stamp to the received data.

At step 406, the data is analyzed by alert module 38. For example, alert module 38 may determine whether there have been repeated login failures to an admin account. As another example, alert module 38 may search for specific keywords within the data. Steps 404 and 406 may be performed contemporaneously or sequentially.

At step 408, unauthorized access is detected. For instance, the number of login failures may have exceeded a threshold or the data may include a keyword. At step 410, an alert is generated and sent to user system 16. The alert may include information. At step 412, information of the alert is presented at user system 16. The alert information may identify the type of unauthorized access and the computer system 12 that was accessed. At step 414, logger 40 creates a log entry in the log file indicating that unauthorized access has occurred. The log entry may include the alert information. Step 414 may be performed contemporaneously or sequentially with steps 410 or 412.

FIG. 5 is a flowchart of an example embodiment of a method for securing a baseboard management controller 28. The method may be performed by logic encoded on a tangible, computer-readable medium when executed by a computer.

In particular examples, baseboard management controller 28 is programmed to listen to a particular port, for example, port 1138, of computer system 12. At step 502, monitoring module 36 connects to port 1138 through communications link 13. The connection is a persistent, direct connection that prevents another connection from accessing the network port. The connection may be made through a CAT-5 or CAT-6 or any other suitable connection. At step 504, monitoring module 36 maintains the connection to port 1138. At step 506 monitoring module 36 receives data from computer system 12 through port 1138. Monitoring module 36 processes the data and passes the data to alert module 38. Logger 40 stores the data.

At step 508, alert module 38 analyzes the data for security events. For example, the data includes messages that indicate login failures. A message may include "login attempt" followed by "login failure" 5 or more, 10 or more, or 15 or more attempts within less than one, less than five, or less than ten minutes. The messages may indicate that login attempt is made from a username "admin" and the password attempts are "admin", "Admin", "A", "B", "C", "D", and so forth. At step 510, alert module 38 determines that the data indicates that a brute force attack has occurred. Alert module 38 creates an alert. At step 512, the alert is sent to user system 16 that indicates that a brute force attack has occurred at computer system 12. The alert could be presented in a pop up window or an email message.

Logger 40 stores the data received from computer system 12. For example, assume that the login attempts occurred one second apart. Logger may store data in the following format:

11:00:00;login attempt;username:admin;pw:admin;login failure

111:00:01;login attempt;username:admin;pw:Admin;login failure

11:00:02;login attempt;username:admin;pw:A;login failure

11:00:03;login attempt;username:admin;pw:B;login failure

11:00:04;login attempt;username:admin;pw:C;login failure

11:00:05;login attempt;username:admin;pw:D;login failure

11:00:06;login attempt;username:admin;pw:E;login failure

11:00:06;break in detected; alert generated

The log file may store some or all data from port 1138. The data may be analyzed to reconstruct the unauthorized access.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

The invention claimed is:

1. A method, comprising:
coupling a monitoring system to a baseboard management controller of a computer system via a console port;
maintaining a persistent connection from the monitoring system to the console port of the baseboard management controller regardless of whether the computer system is powered off, the persistent connection preventing any other connection from accessing the console port;
monitoring data received at the monitoring system from the console port;
determining, by the monitoring system, from the data whether an unauthorized access has occurred;
determining, by the monitoring system, a type of the unauthorized access if the monitoring system determines that the unauthorized access has occurred; and
sending, by the monitoring system, an alert if the unauthorized access has occurred, the alert indicating the determined type of the unauthorized access.

2. The method of claim 1, further comprising:
securing access to the baseboard management controller.

3. The method of claim 1, further comprising:
displaying the alert using a graphical user interface.

4. The method of claim 1, the determining from the data whether the unauthorized access has occurred further comprising:
determining that a number of login failures have occurred; and
establishing the number of login failures exceeds a login failure threshold.

5. The method of claim 1, the determining from the data whether the unauthorized access has occurred further comprising:
detecting a keyword in the data that indicates unauthorized access.

6. The method of claim 1, the determining from the data whether the unauthorized access has occurred further comprising:
detecting a plurality of repeated requests from an Internet Protocol (IP) address for a plurality of different ports of the baseboard management controller.

7. The method of claim 1, the determining from the data whether the unauthorized access has occurred further comprising:
detecting one or more register values corresponding to a signature of a malicious program.

8. The method of claim 1, wherein the computer system is a virtual computer system.

9. The method of claim 1, wherein:
the alert comprises one of a pop-up window or an email message; and
the alert is sent for viewing on a second computer system communicatively coupled to the monitoring system.

10. The method of claim 1, wherein the baseboard management controller is operable to pass communications not directed to the baseboard management controller to the computer system.

11. A method, comprising:
coupling a monitoring system to a baseboard management controller of a computer system via a console port;
maintaining a persistent connection from the monitoring system to the console port of the baseboard management controller regardless of whether the computer system is powered off, the persistent connection preventing any other connection from accessing the console port;
monitoring data received at the monitoring system from the console port;
determining, by the monitoring system, from the data that an unauthorized access has occurred;
determining, by the monitoring system, a type of the unauthorized access if the monitoring system determines that the unauthorized access has occurred; and
sending, by the monitoring system, an alert that the unauthorized access has occurred, the alert indicating the determined type of the unauthorized access.

12. The method of claim 11, further comprising:
securing access to the baseboard management controller.

13. The method of claim 11, further comprising:
logging the data from the console port.

14. The method of claim 11, further comprising:
displaying the alert using a graphical user interface.

15. The method of claim 11, the determining from the data that the unauthorized access has occurred further comprising:
determining that a number of login failures have occurred; and
establishing the number of login failures exceeds a login failure threshold.

16. The method of claim 11, the determining from the data that the unauthorized access has occurred further comprising:
detecting a keyword in the data that indicates unauthorized access.

17. The method of claim 11, the determining from the data that the unauthorized access has occurred further comprising:
detecting a plurality of repeated requests from an Internet Protocol (IP) address for a plurality of different ports of the baseboard management controller.

18. The method of claim 11, the determining from the data that the unauthorized access has occurred further comprising:
detecting one or more register values corresponding to a signature of a malicious program.

19. The method of claim 11, wherein the computer system is a virtual computer system.

20. Software embodied in a non-transitory computer-readable medium and when executed operable to perform operations comprising:
coupling a monitoring system to a baseboard management controller of a computer system via a console port;
maintaining a persistent connection from the monitoring system to the console port of the baseboard management controller regardless of whether the computer system is powered off, the persistent connection preventing any other connection from accessing the console port;
monitoring data received at the monitoring system from the console port;
determining from the data that an unauthorized access has occurred;
determining a type of the unauthorized access if the monitoring system determines that the unauthorized access has occurred; and
sending an alert that the unauthorized access has occurred, the alert indicating the determined type of the unauthorized access.

21. The software of claim 20 further comprising:
securing access to the baseboard management controller.

22. The software of claim 20 further comprising:
logging the received data from the console port.

23. The software of claim 20 further comprising:
displaying the alert using a graphical user interface.

24. The software of claim 20, the determining from the data that the unauthorized access has occurred further comprising:
determining that a number of login failures have occurred; and
establishing the number of login failures exceeds a login failure threshold.

25. The software of claim 20, the determining from the data that the unauthorized access has occurred further comprising:
   detecting a keyword in the data that indicates unauthorized access.

26. The software of claim 20, the determining from the data that the unauthorized access has occurred further comprising:
   detecting a plurality of repeated requests from an Internet Protocol (IP) address for a plurality of different ports of the baseboard management controller.

27. The software of claim 20, the determining from the data that the unauthorized access has occurred further comprising:
   detecting one or more register values corresponding to a signature of a malicious program.

28. The software of claim 20, wherein the computer system is a virtual computer system.

29. A system, comprising:
   one or more processing units operable to:
      couple a monitoring system to a baseboard management controller of a computer system via a console port;
      maintain a persistent connection from the monitoring system to the console port, of the baseboard management controller regardless of whether the computer system is powered off, the persistent connection preventing any other connection from accessing the console port;
      monitor data received at the monitoring system from the console port;
      determine from the data that an unauthorized access has occurred;
      determine a type of the unauthorized access if the monitoring system determines that the unauthorized access has occurred; and
      send an alert that the unauthorized access has occurred, the alert indicating the determined type of the unauthorized access.

30. The system of claim 29, further comprising:
   secure access to the baseboard management controller.

31. The system of claim 29, further comprising:
   display the alert using a graphical user interface.

32. The system of claim 29, the determining from the data that the unauthorized access has occurred further comprising:
   determine that a number of login failures have occurred; and
   establish the number of login failures exceeds a login failure threshold.

33. The system of claim 29, the determining from the data that the unauthorized access has occurred further comprising:
   detect a keyword in the data that indicates unauthorized access.

34. The system of claim 29, the determining from the data that the unauthorized access has occurred further comprising:
   detect a plurality of repeated requests from an Internet Protocol (IP) address for a plurality of different ports of the baseboard management controller.

35. The method of claim 29, the determining from the data that the unauthorized access has occurred further comprising:
   detect one or more register values corresponding to a signature of a malicious program.

36. The system of claim 29, wherein the computer system is a virtual computer system.

* * * * *